Jan. 12, 1971  P. M. HAWKINS  3,554,593

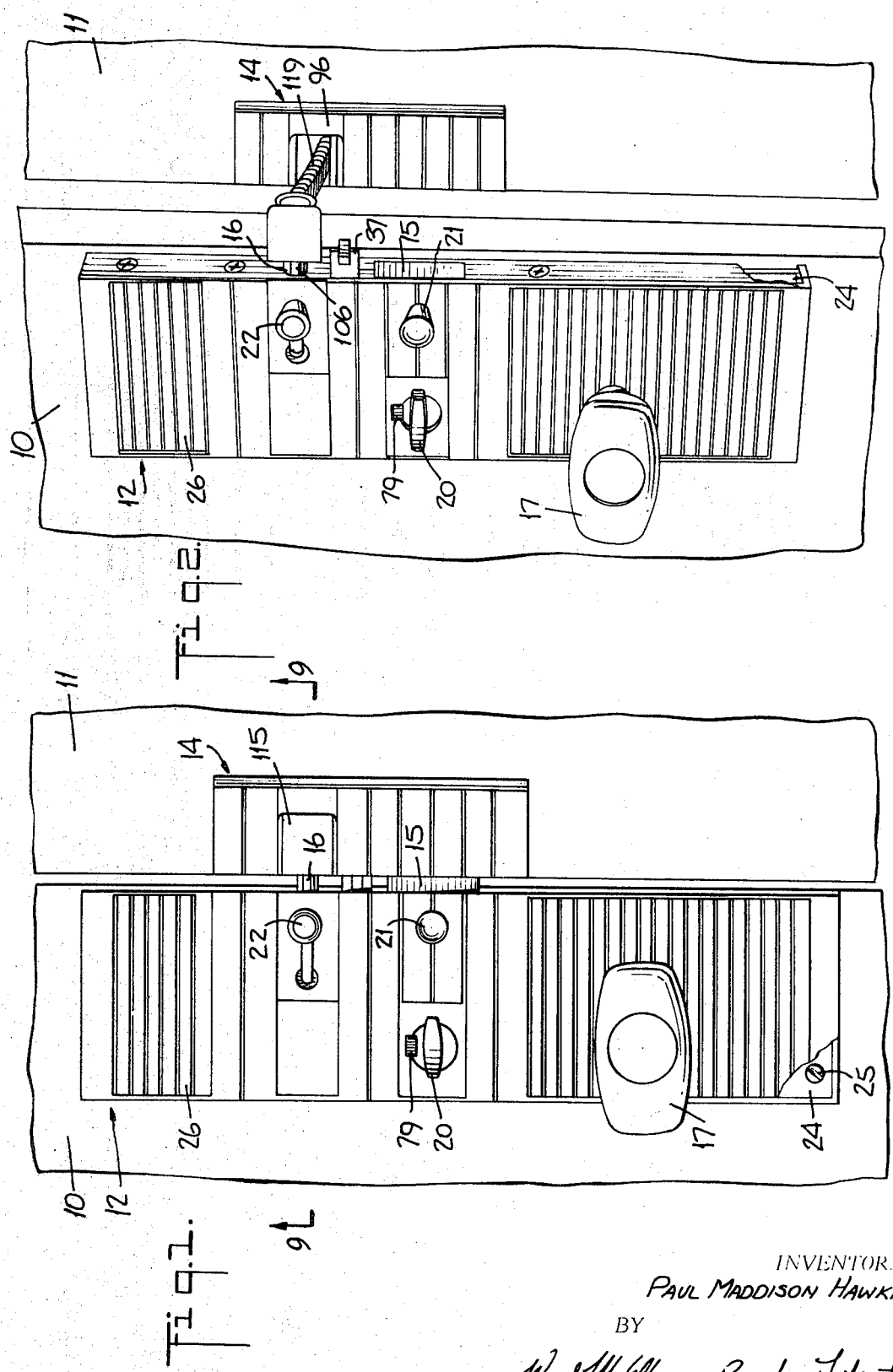

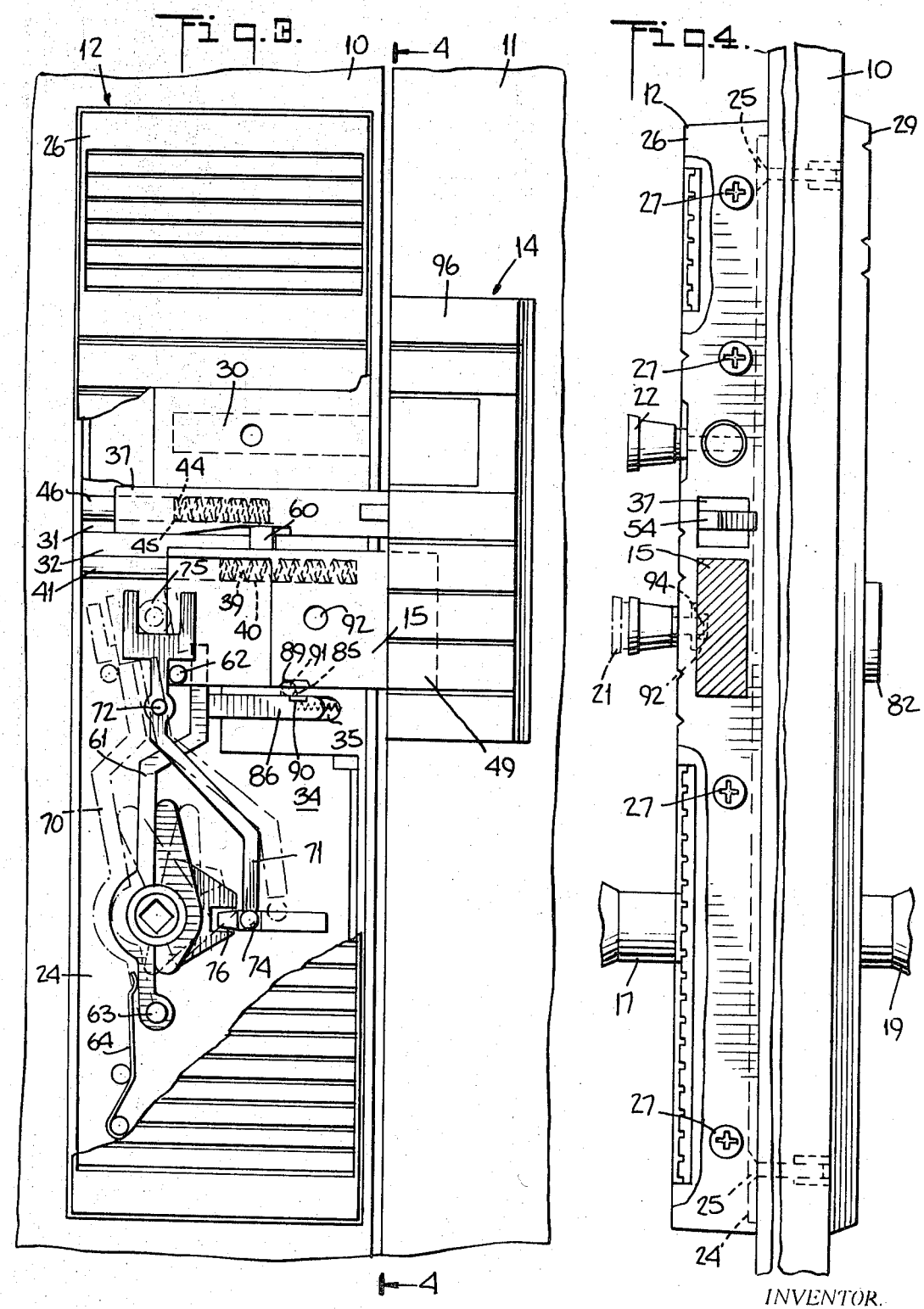

AUTOMATIC LOCKING SYSTEM

Filed April 16, 1968  9 Sheets-Sheet 3

INVENTOR.
PAUL MADDISON HAWKINS
BY
Ward, McElhanney, Brooks, Fitzpatrick
ATTORNEYS Jan. 12, 1971   P. M. HAWKINS   3,554,593
AUTOMATIC LOCKING SYSTEM
Filed April 16, 1968   9 Sheets-Sheet 4

INVENTOR.
PAUL MADDISON HAWKINS
BY
Ward, McElhannon, Brooks & Fitzpatrick
ATTORNEYS

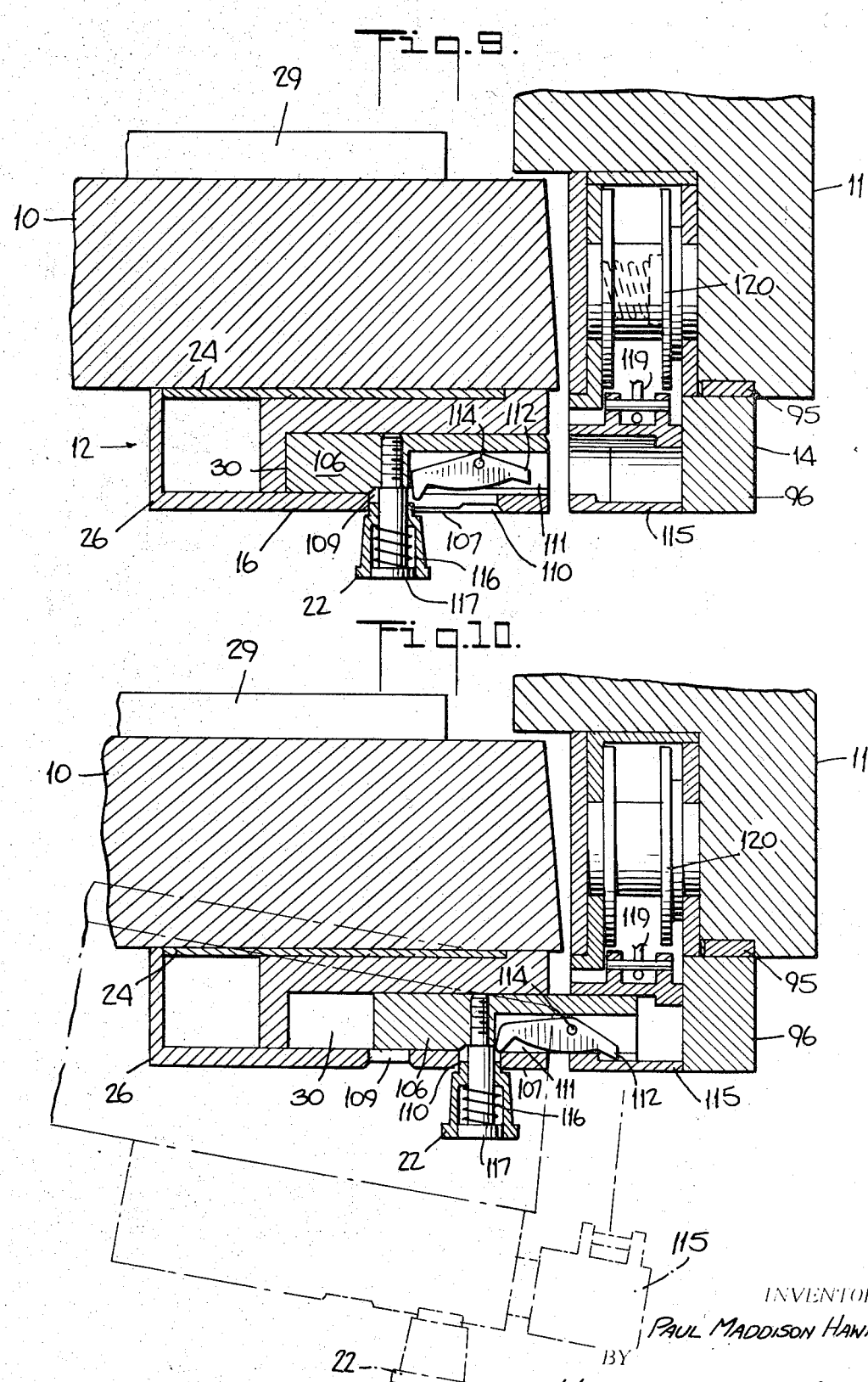

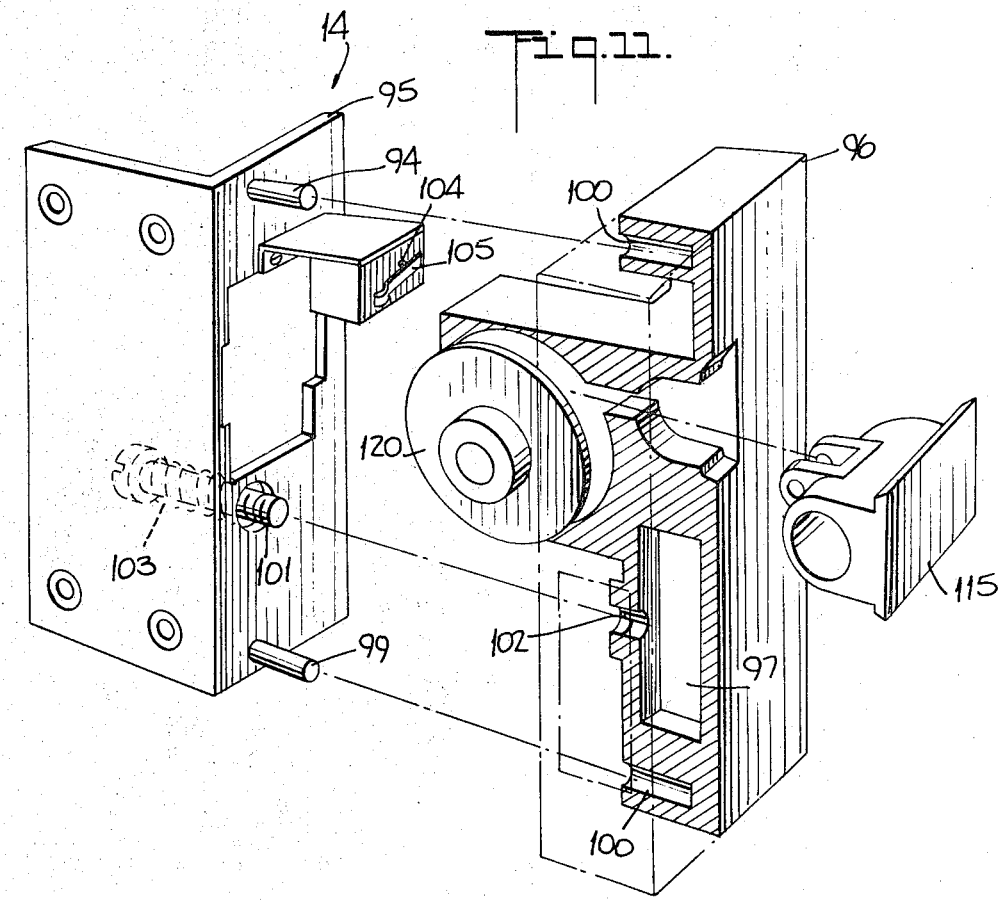
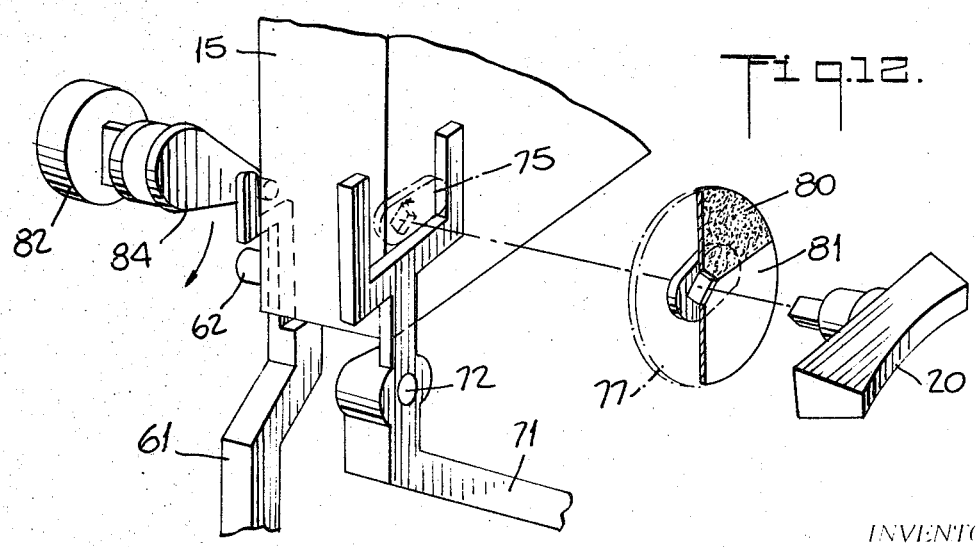

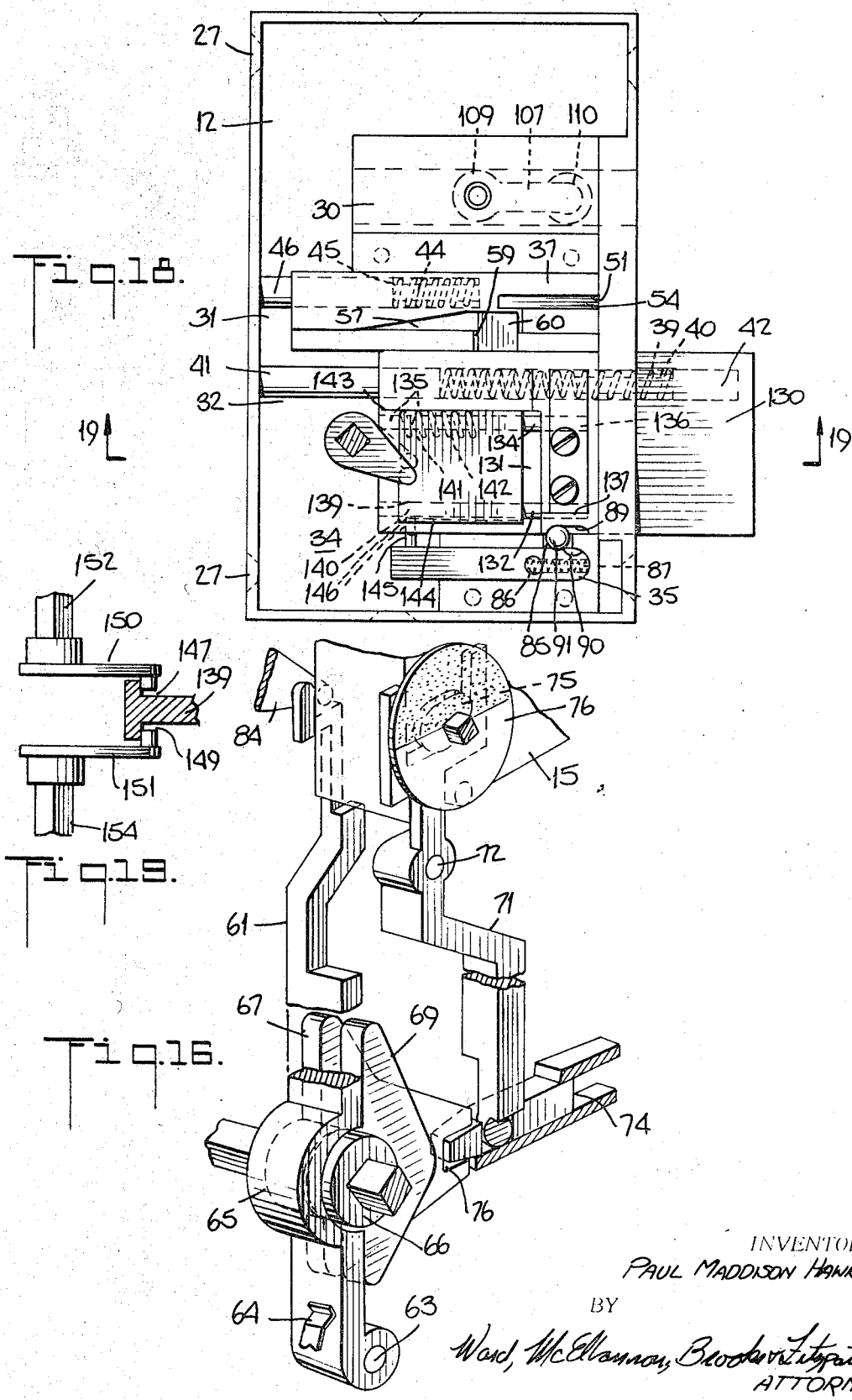

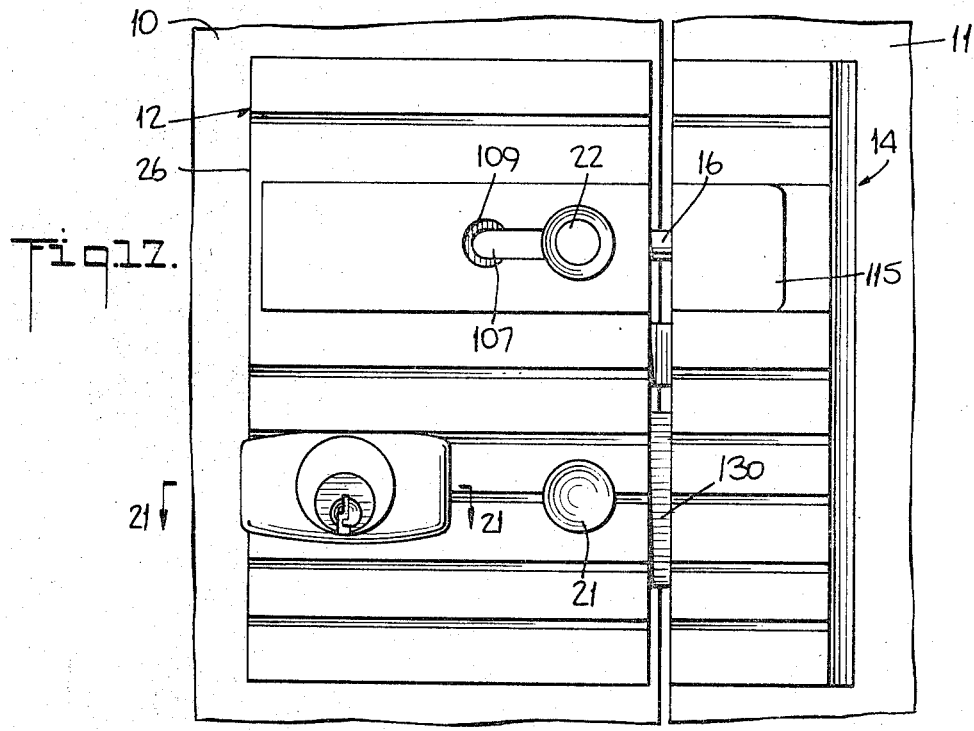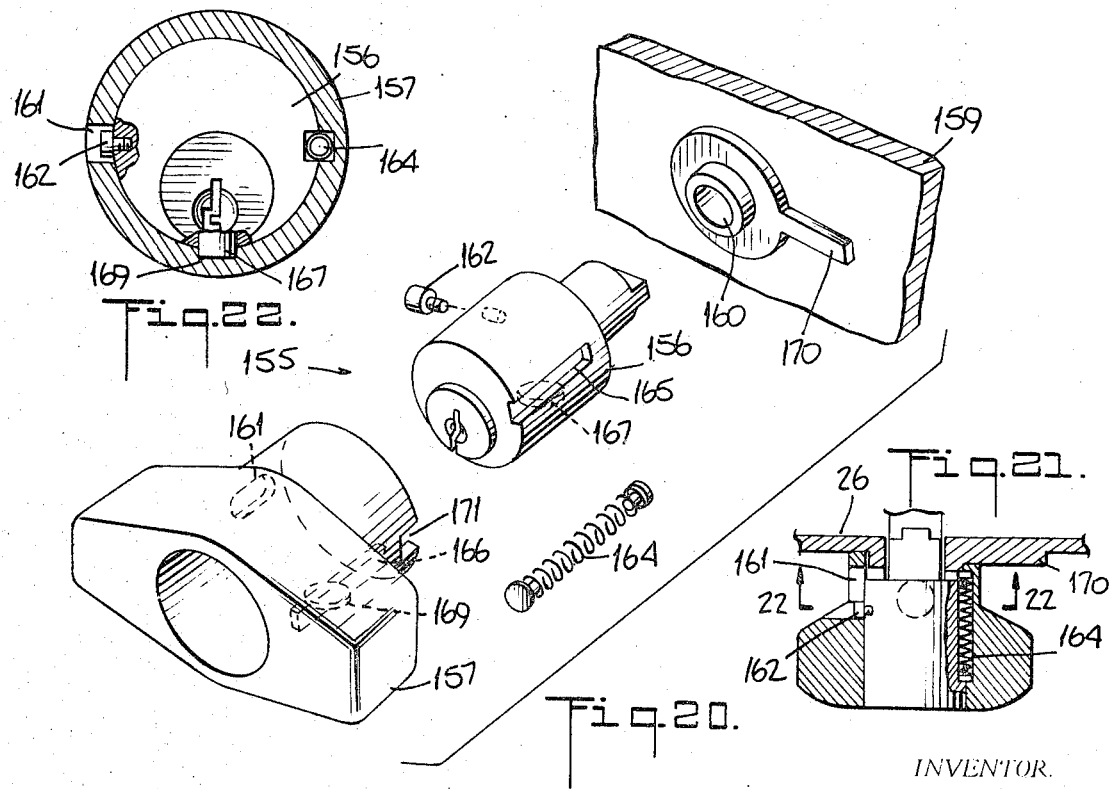

United States Patent Office 3,554,593
Patented Jan. 12, 1971

3,554,593
AUTOMATIC LOCKING SYSTEM
Paul Maddison Hawkins, Stillwater, Minn., assignor to General Alarm Corporation, New York, N.Y., a corporation of Delaware
Filed Apr. 16, 1968, Ser. No. 721,809
Int. Cl. E05b 63/20, 23/04
U.S. Cl. 292—335                                14 Claims

ABSTRACT OF THE DISCLOSURE

A security system for locking closure members and having a locking bolt adapted to be automatically projected to its locking position when the closure members are also in the locking position and having means for automatically deadlocking the locking bolt when it is in the locking position.

---

This invention relates to security systems, and more particularly, to improved means for securing premises against unauthorized entry. In one aspect, the invention involves means for actuating an alarm upon attempted unauthorized entry.

Those persons skilled in the art are aware of the constant and continuing efforts to improve security of persons and property, as well as the fact that while numerous improvements have been made over the years, a satisfactory measure of security has not yet been achieved.

Thus, the present invention contemplates the provision of an improved security mechanism and alarm system to the end that individuals may economically afford themselves and their premises adequate protection against unauthorized entry and may provide warning thereof before entry is actually achieved.

In accordance with one aspect of the present invention, there is provided a novel bolt-type lock mechanism. In general, a bolt-type lock mechanism makes use of a massive locking bolt which is mounted to be manually projected into a bolt keeper. This locking bolt is usually provided with a deadlocking arrangement and also with an external configuration (generally rectangular) which prevents its being retracted by use of prying devices or similarly externally applied tools.

The above described bolt-type lock arrangement which is manually operated, is generally used in conjunction with a "door-latch" arrangement on the same door or closure member.

A so-called "door-latch" arrangement is somewhat similar to a bolt-type lock arrangement in that it projects a "door-latch" element into a keeper to hold a door or other closure in closed position. However, a "door-latch" arrangement uses a latching element which is spring biased to a projected or latching condition. The latching element is generally bevelled toward its outer end so that it will automatically cam itself into the keeper upon closing of the door. Obviously, this latching arrangement does not have a deadlocking feature since this would prevent the "door-latch" from automatically caming itself into the keeper as the door is closed.

The present invention provides the security aspects of a locking bolt together with the automatic engaging aspects of a "door-latch" in a singular compact unit. This is achieved by providing a housing having a locking bolt mounted therein for movement between projected and retracted positions relative to the housing. The locking bolt is spring biased toward its projected position. An internal stop means is provided to hold the locking bolt in its retracted position against the spring bias. A projecting trigger member is provided in the housing to release the stop means, and to allow projection of the locking bolt. The trigger member may be positioned to be engaged and actuated by an element on the door or door jamb when the door is closed and the locking bolt becomes aligned with its keeper.

In accordance with one aspect of the present invention, there is provided a housing which has two parallel guide channels extending through one side thereof. The locking bolt is mounted in one of these channels for reciprocal movement between projected and retracted positions relative to the housing, while the trigger member is mounted in the other guide channel for similar reciprocal movement between projected and retracted positions relative to the housing. Cam notches are provided in the interfacing surfaces of the locking bolt and the trigger member, and means are also provided for biasing both the locking bolt and the trigger member to their projected positions. A floating bolt stop cam is interposed between the two parallel channels to engage the cam notches of the locking bolt and the trigger member. In operation, the bolt stop cam holds the locking bolt in its retracted position when the trigger member is in its projected position and then releases the locking bolt to its projected position when the trigger member is moved to its retracted position by an element on the door or door jamb.

A further feature of the novel locking bolt arrangement of the present invention is that the locking bolt automatically becomes "deadlocked" in its projected or locking position by a deadlocking mechanism so that it may not be forced back by externally applied tools etc. Yet, when authorized retraction is effected, i.e., either internally by actuation of the door knob or externally by use of a proper key, the deadlock will be released as the bolt is retracted. This is achieved in the present invention by the use of a bolt retraction member, such as a lever or a block which moves along a given path within the housing to engage and retract the bolt. The bolt retraction member is arranged to release the deadlocking mechanism from the locking bolt during the initial portion of its bolt retraction movement.

The deadlocking mechanism may include an elongated deadlocking element positioned adjacent to and guided for movement parallel with the locking bolt. The mutually facing surfaces of the bolt and deadlocking element contain slots which accommodate a deadlocking pin. The deadlocking element is preferably spring biased to a first position relative to the bolt and is arranged to be moved from this position by the initial movement of the bolt retraction member.

When the locking bolt is in its projected position, the facing slots in the bolt and the deadlocking arrangement are positioned one above the other so that the deadlocking pin may be loosely accommodated between them. However, any attempt to retract the bolt without retraction of the deadlocking element will displace the slots and wedge the pin between the bolt and deadlocking element. This will prevent retraction of the bolt. On the other hand, when the bolt retracting member is used to retract the bolt, it simultaneously moves the deadlocking element so that the facing slots remain in alignment and avoid the above described wedging of the locking pin.

In accordance with another aspect of the present invention, the bolt retracting member is separately operated by outside and inside door knobs; and a novel latch arrangement, operable by an internal thumb turn, is provided for locking the outside door knob, thus rendering it inoperative to move the bolt retracting element. Means are also provided for internally indicating the locked or unlocked condition of this latch arrangement. For this purpose, a viewing window is provided in the housing and a rotatable indicator disk, responsive to the movement of this latch arrangement, is positioned behind it. The indicator disk is preferably provided with two colored sections, one section being visible through the viewing slot when the latch arrangement is unlocked and the other being visible when the latch arrangement is locked.

The present invention also contemplates the combination with those aspects of the security system already described, means warning of attempted unauthorized entry when the door is secured by the locking bolt or when the door is partially opened but secured by a chain lock.

In still another aspect of the present invention, novel means are provided for key locking the security locking device so as to prevent operation of the bolt retraction element from inside of the door. This arrangement permits the locking device to be used effectively on glass doors and other closures which may be partially broken into, since the locking mechanism cannot be retracted from the inside without a special key, and thus any attempt by a potential thief to break the glass or the like and reach in to unlatch the door is rendered ineffective.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several aspects of the invention. It is important, therefore, that the claims be regarded as including such equivalent constructions as do not depart from the spirit and scope of the invention.

Certain specific applications of the invention have been chosen for purposes of illustration and description, and are shown in the accompanying drawings forming a part of the specification wherein:

FIG. 1 is a front elevational view, showing in closed condition a door locking arrangement in which the present invention is embodied;

FIG. 2 is a view similar to FIG. 1 showing the arrangement in partially opened condition;

FIG. 3 is an enlarged elevational view partially broken away, of the security locking system of FIG. 1;

FIG. 4 is a view taken along line 4—4 of FIG. 3;

FIG. 9 is an enlarged section view taken along line 9—9 of FIG. 1, and showing a chain engagement portion thereof in its non-engaging position;

FIG. 10 is a view similar to FIG. 9 showing the chain engagement portion in engaging position;

FIG. 11 is an exploded perspective view of a strike plate assembly used in the door locking arrangement of FIG. 1;

FIG. 12 is a fragmentary perspective view showing a key lock and lock condition indicator used in the door locking arrangement of FIG. 1;

FIG. 16 is a perspective view of a locking bolt retraction mechanism used in the door locking arrangement of FIG. 1;

FIG. 17 is a front elevational view of another door locking arrangement embodying the present invention;

FIG. 18 is a view similar to FIG. 17, but showing the interior of the arrangement of the door locking arrangement of FIG. 17;

FIG. 19 is a fragmentary section view taken along line 19—19 of FIG. 18;

FIG. 20 is an exploded view showing a door knob locking assembly used in the door locking arrangement of FIG. 17;

FIG. 21 is a section view taken along line 21—21 of FIG. 17; and

FIG. 22 is a view taken along line 22—22 of FIG. 21.

Figure 5:
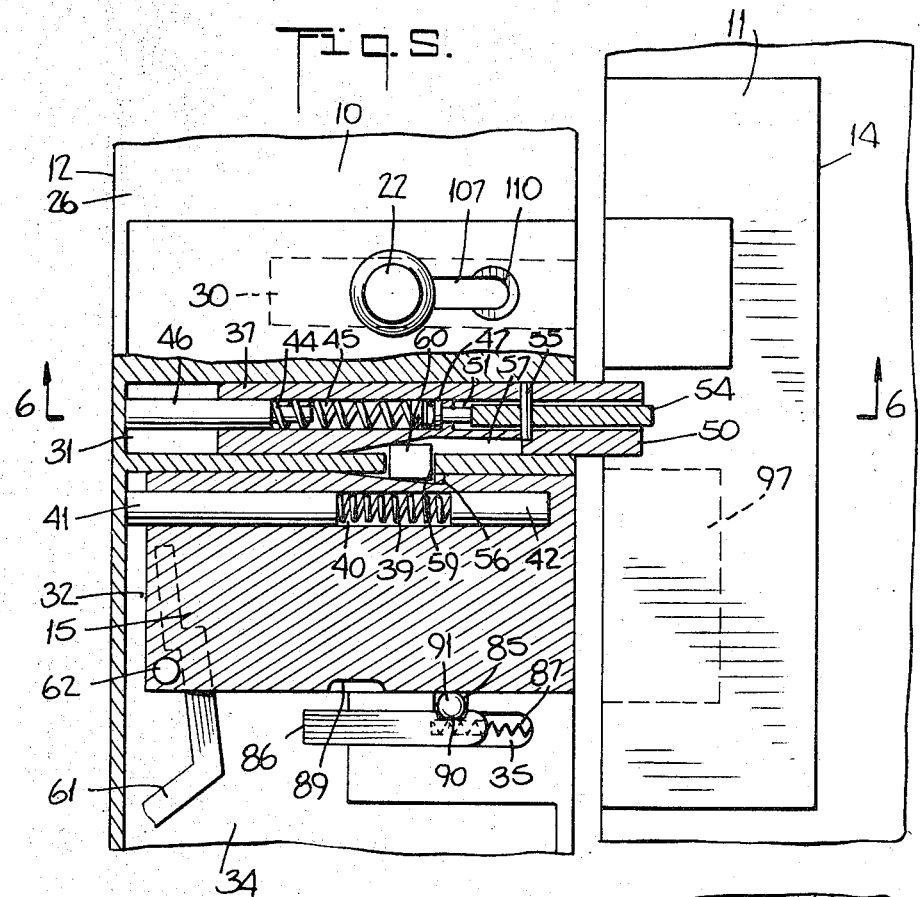
FIG. 5 is an enlarged fragmentary view, partially broken away, showing a locking bolt mechanism used in the door locking arrangement of FIG. 1 in its retracted or unlocked position.

As shown in FIG. 1, the door lock arrangment of the present invention is adapted for use in connection with a door 10 and a door jamb 11 to which the door may be locked against movement. A lock housing 12 is mounted on the door 10, and a strike assembly 14 is mounted in the door jamb 11. The lock housing 12 supports a locking bolt 15 and a chain engaging arrangement 16, both of which secure the lock housing 12 to the strike plate assembly 14. The locking bolt 15 is operated, in part, (i.e. reraced), by an inner knob 17, and an outer knob 19 (see FIG. 4). A thumb turn 20 and a total security button 21, are provided on the surface of the housing 12 to lock the bolt 15 from movement as will be described below. In addition, there is provided a chain engaging knob 22 which operates the chain engaging arrangement 16.

Figure 7:
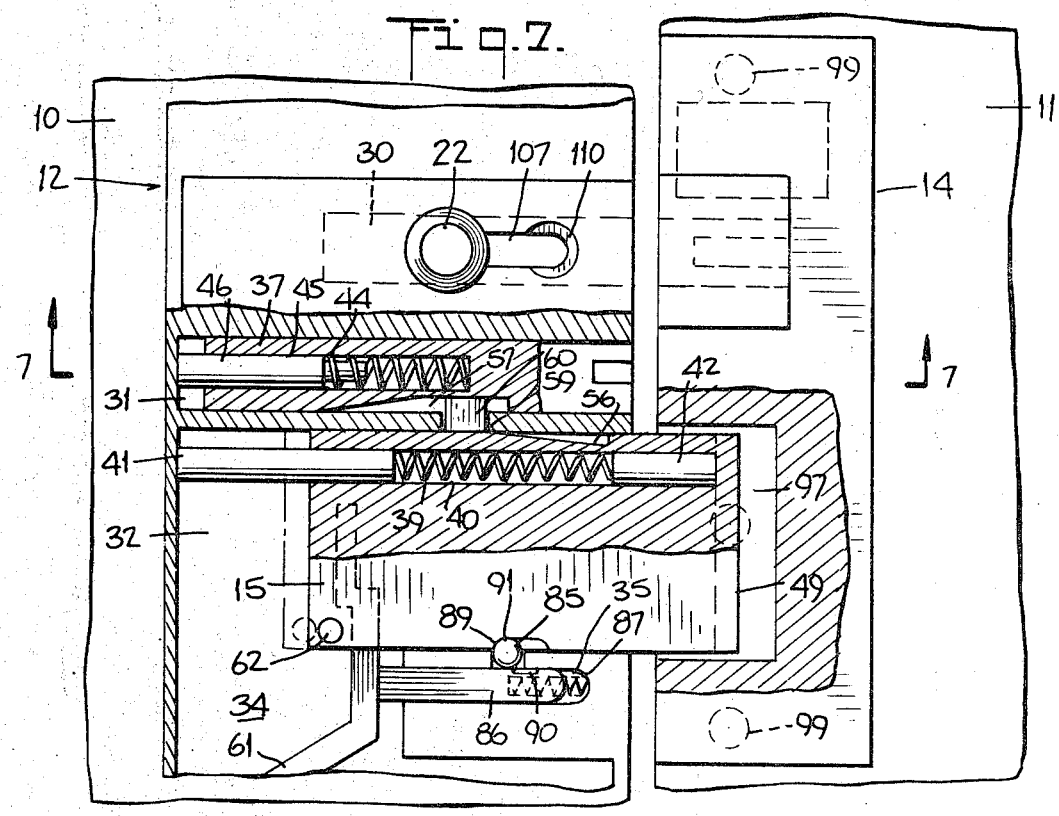
FIG. 7 is a view similar to FIG. 5 showing the locking bolt mechanism in its projected or locked position.

As shown in FIGS. 1-4, the lock housing 12 includes a mounting plate 24 fastened to the door 10 by fastening means such as screws 25, and a cover 26 which may be secured to the mounting plate 24 also by screws 27. As shown in FIG. 4, the screws 25 securing the mounting plate 24 to the door 10, may extend through the door 10 and engage a facing plate 29. As best shown in FIGS. 3, 5, and 7, the cover 26 is formed with three guide channels 30, 31, and 32 which open out along the longitudinal side closest to the door jamb 11. Preferably, the cover 26 otherwise defines a hollow 34 with the mounting plate 24 except for an additional guide channel 35 which opens into the hollow 34. The function of guide channels 30, 31, 32, and 35 will be more fully explained hereinafter.

Referring to FIGS. 3-8, the guide channels 31 and 32 support the locking bolt 15 and a trigger member 37, respectively, for reciprocating movement between projected and retracted positions relative to the door 10. The locking bolt 15 is biased toward a projected position by a compression spring 39 which is positioned within a bore 40 in the bolt 15 and which acts against the bolt via a spring rod 41 and a pin 42 (FIG. 5) inside the bore 40. The pin 42 is preferably made of a saw-proof material to prevent surreptitious cutting of the locking bolt when in the projected position. The trigger member 37 is likewise biased to a projected position by a spring 44 which is positioned in a bore 45 in the trigger member. The spring 44 acts against the trigger spring rod 46 and a pin 47. As best shown in FIG. 7, the locking bolt 15 is formed with a projecting portion 49 which is of rectangular configuration. On the other hand, the trigger member 37 is formed with a corresponding projecting portion 50 (FIG. 6) which is bevelled, as a normal door latch element, in the direction away from the door jamb 11.

Figure 6:
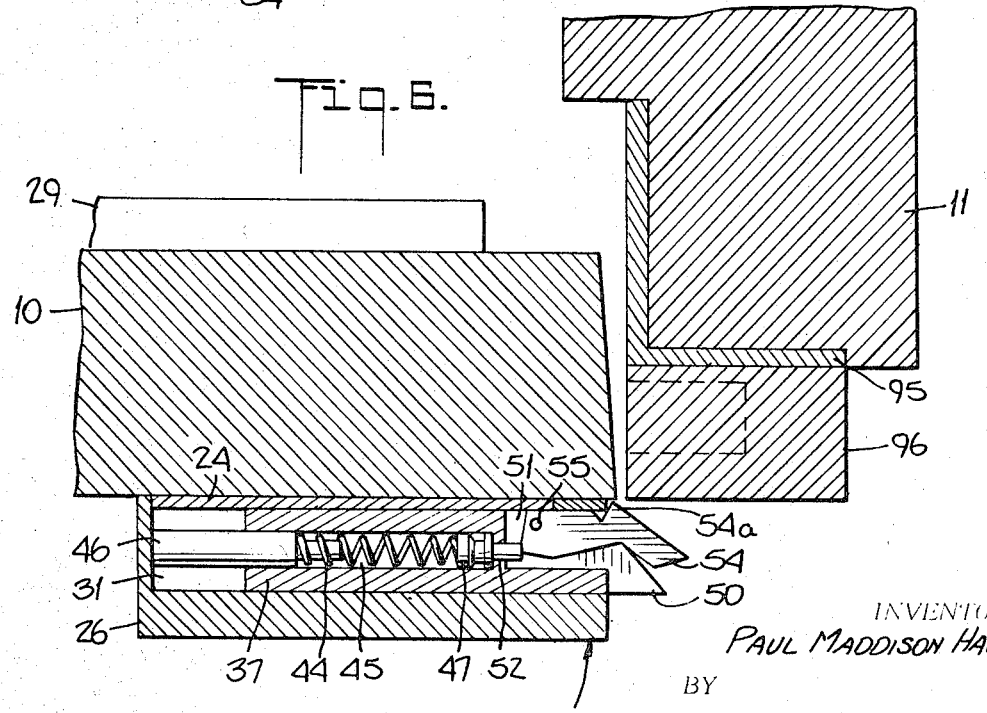
FIG. 6 is a section view taken along line 5—5 of FIG. 5.
Figure 8:
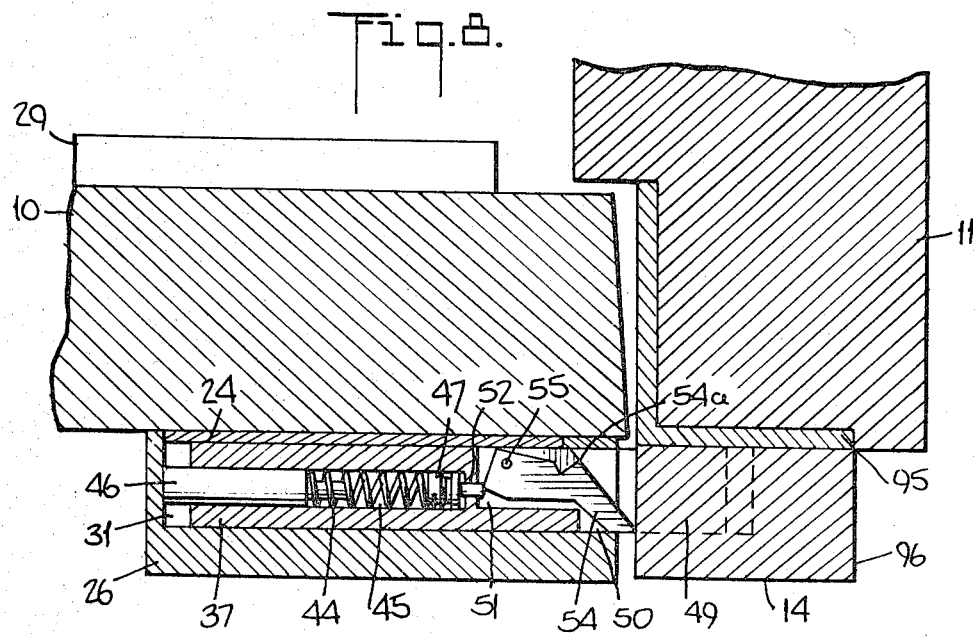
FIG. 8 is a section view taken along line 7—7 of FIG. 7.

As shown in FIGS. 5, 6 and 8, a horizontally extending slot 51 is cut in the projecting portion 50 of the trigger member 37. A trigger latch element 54, is mounted in the slot 51 for horizontal pivotable movement about a pin 55 located toward the rear of the slot. The trigger latch element 54 is bevel shaped at its outer end to conform to the shape of the projecting portion 50 of the trigger member 37. The latch element 54 is also provided with a latch abutment formation 54a which engages the edge of the mounting plate 24 when the latch element 54 is pivoted toward the strike plate assembly 14. As shown in FIG. 6, the latch element 54 is engaged by an extension 52 of the spring biased pin 47 and is thus itself biased to the above described position engaging the edge of the plate 24. In this position the trigger latch element 54 prevents retraction of the trigger member 37 by direct retraction movement such as is normally encountered by inadvertent pressure on the end of the trigger member. When, however, the door 10 is closed, the latch element will first engage the strike plate assembly and be pivoted thereby to release its abutment formation from the edge of the plate 24. This releases the trigger element 37 and allows it to retract as the door continues to close.

Returning to FIGS. 5 and 7, it will be noted that the mutually facing surfaces of the locking bolt 15 and the trigger member 37 are provided with notches 56 and 57, repsectively, which are cut substantially as shown, and which communicate with one another through a slot 59 interconnecting the guide channels 31 and 32. A bolt stop pin 60 is positioned loosely in the slot 59 of the housing 12, and is shaped to project part way into the notches 56 and 57. As shown in detail in FIGS. 5 and 7, the facing surfaces of the notches 56 and 57 taper toward each other in a rearward direction. Each notch is sufficiently deep at its deepest portion so that when the deepest portion of one notch is aligned with the housing slot 59, it accommodates so much of the bolt stop pin 60 that none of it projects into the other notch. The deepest portions of the notches 56 and 57 are located to become aligned with the housing slot 59 when their resistive members, i.e. the locking bolt 15 and the trigger member 37 are fully retracted. Thus, when either of these members is fully retracted the other member is free to project. However, if either member, (e.g. the trigger member 37), is projected while the other member (e.g. the bolt 15) is retracted, the bolt stop pin 60 will interfere with the tapered surface of the notch of the retraced member and prevent the member from projecting. When, on the other hand, the trigger member 37 is retracted, its notch 57 becomes aligned with the housing slot 59 to accommodate sufficient portions of the bolt stop pin 60 to allow the bolt 15 to project. Under these latter conditions, compression spring 39 will automatically project the bolt 15 when it is so released.

In operation of the device, the bolt 15 is initially retracted against the force of the compression spring 39. At the same time the trigger member 37 is projected; and its lower edge forces the bolt stop pin 60 down into the bolt notch 56. The pin 60 engages the tapered surface of the bolt notch 56 and latches the bolt in its retracted position against the action of the spring 39. When the door 10 is closed, the projected trigger member 37 is forced against the strike assembly 14. Because of the bevelled surface of the trigger member 37, the strike assembly acts to retract it in the same manner that an ordinary door latch element is retracted when the door is closed. Retraction of the trigger element 37 however, brings its notch 57 into alignment with the slot 59 and allows the bolt stop pin 60 to move upwardly and release the bolt 15. The bolt projects into the strike assembly 14 thus locking the door 10.

The bolt 15 is retracted to permit opening of the door when either the inside knob 17 or the outside knob 19 is turned. The mechanism for achieving this is shown in FIGS. 3, 12 and 16. A bolt retraction lever 61 is pivotally mounted at one end by means of a pin 63, to the inside of the lock housing 12. The other end of the lever 61 is arranged to engage a pin 62 on the locking bolt 15 as the lever is pivoted in a rearward direction. This action serves to pull the bolt 15 back to a retracted position. A leaf spring 64 is positioned between the lever 61 and the housing and biases the lever to a forward position as shown in solid outline in FIG. 3. The forward position of the lever 61 is limited, as shown in FIG. 16, by the engagement of a curved portion thereof with a pair of cylinders 65 and 66. These cylinders are aligned with and rotated respectively by outside and inside knobs 19 and 17, respectively. Winged cams 67 and 69 are connected to the cylinders 65 and 66, respectively, and are rotated by turning the associated door knobs. The wings of these cams bear against and urge the bolt retraction lever 61 to its rearward position indicated at 70 in phantom outline in FIG. 3.

As shown in FIGS. 3, 12 and 16, there is provided an outside knob locking arrangement whereby the outside knob 19 may be locked from turning by operation of the inside thumb turn 20. This locking arrangement includes a knob lock lever 71 pivotally mounted in the center thereof by means of a pin 72 to the interior of the lock housing 12. The lower end of the lever 71 moves a slidable latch pin 74 back and forth in a horizontal direction when the lever 71 is pivoted. The latch pin 74, when moved operable by the latch cam 75 to insert and retract the latch to a rearward position engages a slot 76 formed in the winged cam 67 which is operated by the outside door knob 19. When the latch pin 74 engages the slot 76 it prevents the cam 67 and its associated door knob 19 from turning. The upper end of the knob lock lever 71 is forked, as shown in FIGS. 3, 12 and 16; and an eccentric lock operating cam 75 is positioned to rotate in the housing 12 between the forked arms of the lever 71. Rotation of the cam, thus causes the lever 71 to pivot about the pin 72 to move the latch pin 74. The cam 75 is connected to and turned by the thumb turn 20. An indicator disk 77 is mounted coaxially with and is turned by the thumb turn 20. The disk 77 is divided into two equal sectors of different colors, either of which may become aligned with an indicator window 79 in the housing 12, depending upon the position of the cam 75. In this manner, the disk 77 will provide an indication of the locked or unlocked condition of the outside door knob 19. Thus, as shown in FIG. 12, the indicator disk 77 may be provided with a red sector 80 and a green sector 81, the red sector 80 being visible through the indicator window 79 when the outside door knob 19 is unlatched and the green sector 81 being visible through the indicator window 79 when the outside knob is locked.

The outside door knob 19 may be unlocked from inside by operating the thumb turn 20 as described above. It may also be unlocked from outside by means of a key so that the locking bolt 15 may be retracted. In this connection, there is provided a cylinder lock 82, actuable by a key inserted from the outside of the door 10. The cylinder lock 82 is arranged to rotate the lock cam 84 in the direction shown by the arrow in FIG. 12. The lock cam 84 engages the bolt retraction lever 61 and moves the same in substantially the same manner as that carried out by the wing cams 67 and 68, described above to retract the bolt 15. Thus, when the lock cam 84 is rotated in the direction shown by the arrow in FIG. 12, it bears against the bolt retraction lever 61 and moves it to the position 70 shown in phantom in FIG. 3 thereby simultaneously moving the bolt 15 to its retracted position.

As indicated above, there are provided means for automatically deadlocking the locking bolt 15 in its projected condition. To this end, a slot 85 is provided to interconnect the guide channels 32 and 35, and a deadlocking bar 86 is provided in the channel 35. As shown in FIGS. 3, 5 and 7, the deadlocking bar 86 extends into the hollow 34 and is biased in that direction and to a first position by compression spring 87. As shown in FIGS. 3 and 7, the end of the deadlocking bar 86 which extends into the hollow 34, is engaged by the spring biased bolt retracting lever 61 and is forced thereby against the bias of compression spring 87 further into the channel 35 and to a second position. A notch 89 is provided in the locking bolt 15 at the point where it communicates with the slot 85 when the locking bolt is in its projected position. Similarly, a notch 90 is provided in the deadlocking bar 86 at the point where it communicates with the slot 85 when the deadlocking bar 86 is in its biased or first position mentioned above. As shown in FIGS. 3, 5 and 7, a roller 91 is positioned in the slot 85 and is adapted to selectively engage the mentioned notches 89 and 90 in the following manner.

When the locking bolt 15 is being retracted by the bolt retracting lever 61, the described biasing effect thereof on the deadlocking bar 86 is removed, and the deadlocking bar 86 thus assumes its biased or first mentioned position. When the deadlocking bar is in this first position, the roller 91 positioned in the interconnecting slot 85 is forced into the notch 90 of the deadlocking bar and held there by the surface of the locking bolt 15, even after the bolt retracting lever 61, under the effect of the leaf spring 64, re-engages the deadlocking bar 86 upon fully retracting the locking bolt 15.

When the locking bolt 15 is automatically projected by the locking bolt mechanism described above, the notch 89 provided in the locking bolt 15 is positioned above the interconnecting slot 85. When the locking bolt 15 is so positioned, the deadlocking bar, under the bias of the retracting lever 61, moves to its second position and simultaneously forces the roller 91 into the notch 89 of the locking bolt. As shown in FIG. 7, the roller 91 is thereupon held in the notch 89 of the locking bolt 15 by the mutually facing surface of the deadlocking bar 86, and thus the locking bolt 15 is deadlocked against any external horizontal movement.

The overall locking bolt mechanism operates to lock closure members as follows. As shown in FIGS. 2, 3, 7 and 8, when the door 10 is closed, the locking bolt 15 projects into the strike plate assembly 14 and locks the door against movement while the trigger member 37 is retained in its retracted position by the above described action of the bolt stop 60. While in this position, the locking bolt is automatically deadlocked by the described action of roller 91 and the outside door knob 19 is locked by the operation of the knob lock lever 71.

In order to open the door 10, either the inside knob 17 or the outside cylinder lock 82 must be rotated so that one of the cams 69 or 84, respectively, push back the bolt retracting lever 61 to the position shown in FIG. 5, and thus release the deadbolting of the locking bolt 15 as aforesaid. As the bolt retracting lever 61 is pushed back, the locking bolt 15 is also moved by the bolt retracting lever 61 to its retracted position and held thereto by the described operation of the bolt stop 60. As described above, the movement of the locking bolt to its retracted position, disengages the bolt stop from the trigger to its biased projected portion member and thus allows the trigger member to assume its projected position.

When the door 10 is again closed, the bevelled portion of the trigger member 37 hits the strike plate assembly 14 and is forced thereby to the retracted position. As described above, this operation automatically releases the locking bolt 15 to its projected position and deadlocks the same by the described operation of the roller 91, thus again automatically locking the door 10 with the full security of a heavy deadbolt and without any other manual operation.

As has also been stated, the present invention provides a total security feature according to which the locking bolt may not be retracted at all, even by an authorized key. For this purpose, and as seen in FIGS. 3 and 4, the locking bolt 15 is provided with an opening 92 which communicates with the total security button 21 when the locking bolt is in the projected position. The total security button 21 when the locking bolt is in the projected position. The total security button 21 which is secured to the lock housing 12 controls a reciprocable pin 94 in a manner to permit it to be positioned in the opening 92 or to be withdrawn therefrom. It will be appreciated that so long as the pin 94 extends into the opening 92, the locking bolt cannot be retracted by any means since the locking bolt is retained against horizontal movement by the housing 12. Thus, when total security is desired, as when a family is retiring for the night and no arrivals are expected, total security is is available merely by depressing the total security button A would-be intruder with a stolen or duplicate key cannot then gain entrance.

Figures 13, 14:
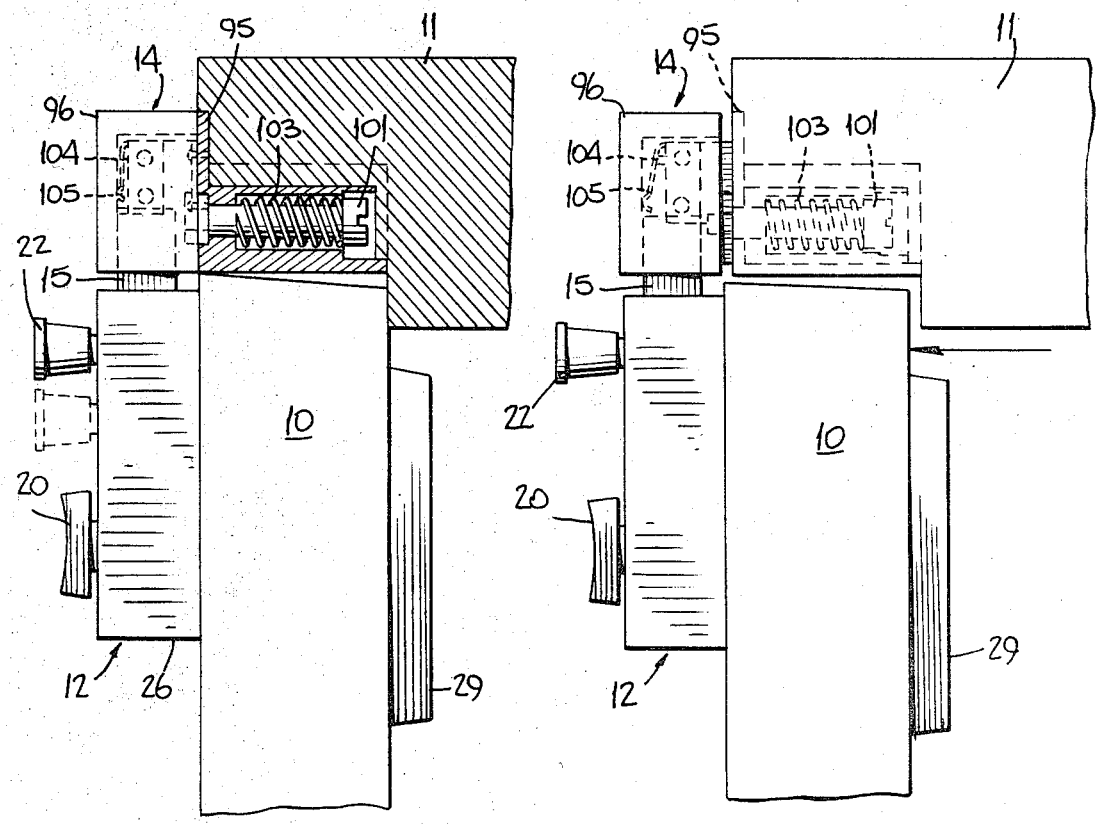
FIG. 13 is a top view, partially in section, showing a force responsive alarm actuating portion of the door locking arrangement of FIG. 1, in triggered position.
FIG. 14 is a view similar to FIG. 13 and illustrating bolt actuation of the alarm.

As pointed out above, the present invention also provides means for warning of attempted unauthorized entry when the door is secured by the locking bolt. To this end, a force sensitive strike plate assembly is provided to actuate an alarm system (not shown) when a predetermined opening force is applied to the door 10. As shown in FIG. 11, the strike plate assembly 14 includes an anchor plate 95 mounted in mortise fashion in the door jamb 11, and a cover 96 having a locking bolt receiving hole 97 for receiving the locking bolt 15. The cover 96 is secured to the anchor plate 95 in a manner allowing limited relative movement between the cover and the plate. To this end, guide pins 99 and slots 100 therefor are provided in the anchor plate 95 and the cover 96, respectively. Additionally, the anchor plate 95 and cover 96 are secured together by a bolt 101 which is fastened through the threaded hole 102 in the cover 95 and which biases the cover against the anchor plate under the influence of compression spring 103. This biased arrangement allows predetermined relative movement between the anchor plate and the cover along the longitudinal axis of the guide pins 99. A normally open alarm circuit control switch 104 is mounted on the anchor plate 95 and is operated by the control spring arm 105. As shown in FIGS. 13 and 14, the spring arm 105 normally engages the interior of the cover 96 to maintain the switch 104 in the open position, but it is also operable to close the switch 104 when a predetermined lateral pressure in the direction of the arrow shown in FIG. 14 is applied to the closed door 10.

A further feature of the present invention provides in combination with those aspects of the security system already described, a chain lock which will activate the alarm if excessive pressure is exerted on the door while in the partially opened and chained condition. For this purpose, and as seen in FIGS. 9 and 10, a chain pick-up rod 106 is mounted in the guide channel 30 of the cover 26 for reciprocal movement between locked and unlocked positions. As best seen by a comparison of FIGS. 1 and 9, the cover 26 has a horizontal slot 107 which communicates with the guide channel 30, and has two larger bored holes 109 and 110 at the far and near ends of the horizontal slot 107, respectively. A horizontal slot 11 is also provided in the chain pick-up rod 106, and this communicates with the slot 107 of the cover 26 as well as the open end of the channel 30. A chain anchor retaining cam 112, shaped as shown in FIG. 9, is provided in the slot 111 of the pick-up rod. The retaining cam 112 functions to secure the chain anchor 115 provided in the strike plate assembly to the chain pick-up rod 106 in a manner more fully described hereinafter.

A chain pick-up knob 22 is biased by the spring 116 to sit securely in the bored holes 109 and 110 of the cover 26, and the pick-up knob 22 is connected to the pick-up rod 106 by a tension screw 117 provided in the pick-up knob housing. The chain pick-up knob 22 functions to engage and disengage the pick-up rod 106 from the chain anchor 115. When the pick-up knob 22 is in the far hole 109, the pick-up rod is disengaged from the chain anchor 115 and is automatically locked in the hole 109 by the bias of the spring 116, thus guarding against any accidental engagement of the chain anchor. To engage the chain anchor 115, the knob 22 is lifted from the hole 109 against the bias of spring 116, moved to the near hole 110, and positioned therein. As shown in FIG. 10, when the pick-up rod 106 is so positioned in hole 110, the chain anchor cam 112 is pivoted by the side of slot 107 to lock against the chain anchor and is held in this position by the spring biased pick-up rod 106.

As shown in FIGS. 2, 9, 10 and 11, the chain anchor 115 is attached to one end of a chain 119 which has its other end secured to a spring biased reel 120 for automatically winding the chain 119. As shown in FIG. 11, the chain anchor 115 and the cover 96 are preferably shaped to form continuous surfaces between one another when the chain 119 is completely wound.

Figure 15:
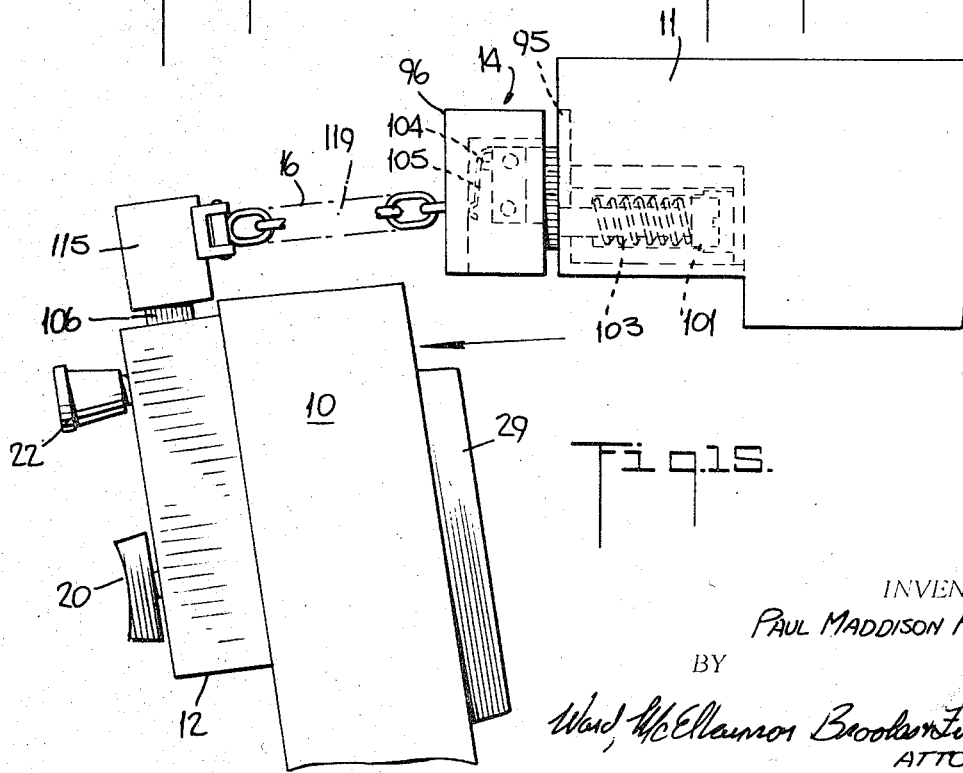
FIG. 15 is a view similar to FIG. 13 and showing chain actuation of the alarm.

As shown in FIGS. 2 and 10, when the chain pick-up rod 106 is secured to the chain anchor 115 in the manner aforesaid, the door 10 may be only partially opened as is the case with most chain locks. Referring, however, to FIG. 15, it may be seen that since the chain 119 is connected to the cover 96 of the strike plate assembly, any excessive force exerted on door 10 while in the partially opened position, will cause predetermined movement between the anchor plate 95 and the cover 96, and thus cause the spring arm 105 to close switch 104 to actuate the alarm.

Turning now to FIGS. 17–22, there is shown another embodiment of the present invention having specially designed features which offer the greatest possible protection for glass paneled doors and the like. This embodiment has most of the same features of the embodiment shown in FIGS. 1–16, and, therefore, like reference numerals will be used to indicate like structure and function to avoid needless discussion thereof. Thus, as shown in FIG. 17, the security locking system of this embodiment includes, as in the previously described embodiment, a lock housing 12 which is adapted to be mounted on the door 10 and a strike plate assembly 14 which is adapted to be mounted in the door jamb 11. As in the previous described embodiment, the housing supports a locking bolt 130 which is adapted to be automatically projected when the door 10 is closed.

The embodiment illustrated in FIGS. 17–22 differs from that illustrated in FIGS. 1–16 chiefly in the manner in which the locking bolt is manually retracted and the deadlocking bar is actuated. As shown in FIG. 18, the locking bolt 130 is shaped substantially as the locking bolt 15 but for a cut-out 131 made in its rear portion. The cut-out 131 extends from the center of the locking bolt 130 to its rear portion and is shaped to house a floating retracting block 139. The locking bolt 130 still cooperates, however, with the trigger member 37 and the deadlocking bar 86 as the locking bolt 15. Slideways 132 and 134 are provided in bores 135, 136 and 137 of the locking bolt 130 to guide the floating retracting block 139 thereon. The floating retracting block 139 is provided with two bores 140 and 141 which extend completely along its longitudinal axis and in which the slideways 132 and 134 project. In addition, the floating retracting block 139 is biased by a spring 142 in the direction towards the locking bolt's projected position and away from the rear portion 143 of the locking bolt 130.

The bottom of the floating retracting block 139 is provided with a horizontal channel at 144 which is open to a tab 145 of the deadlocking bar 86 and which channel defines a stop at 146 for the tab. As shown in FIG. 19, cam engaging slots 147 and 149 are provided in each of the lateral sides of the retracting block 139 and are adapted to accept key cams 150 and 151, respectively. In accordance with one aspect of the present invention, separate cylinder locks 152 and 154 are positioned in the outside and inside parts of the door 10 and these operate key cams 150 and 151, respectively, to retract the locking bolt 130 in a manner to be described.

When the locking bolt 130 is positioned in its projected or locked position, the floating retracting block 139 engages the tab 145 of the deadlocking bar 86 and cooperates with the bar to compress the spring 142 and to bias the floating retracting block 139 to the projected position shown in FIG. 18. This arrangement additionally produces a biasing effect on the deadlocking bar 86 and operates in substantially the same manner as the bolt retraction lever 61 to effect automatic deadlocking of the locking bolt 130.

In order to retract the locking bolt 130 and open the door, either key cam 150 or 151 is rotated by its respective cylinder lock 152 or 154. This rotation disengages the floating retraction block from the deadlocking bar 86, and thus releases the latter's deadlocking effect on the locking bolt. Since the floating retraction block 139 is mechanically coupled to the locking bolt at portion 143, further rotation of either key cam additionally retracts the locking bolt 130 to its retracted position.

As stated above, cylinder locks 152 and 154 are positioned in the outside and inside parts of the door 10, respectively, in order that the locking bolt may be retracted and the door opened from either side. These cylinder locks may be mounted either substantially flush in the door facing fixtures or incorporated in the door knob fixtures. Obviously, if the former mounting is preferred, a separate door handle or lock-set must be used. Additionally, the features of both may be used conjunctively, i.e. one type of mounting on the outside of the door and the other type on the inside of the door.

FIGS. 17, 20, 21 and 22 show a door knob assembly 155 specially constructed to operate the key cams of the present embodiment. As shown in the exploded view of FIG. 20, this assembly includes a cylinder lock 156, a handle or knob 157 for housing the cylinder lock, and a housing cover 159 especially adapted to cooperate with the cylinder lock and the door knob in a manner to be described. The cover 159 is provided with an aperture 160 which allows the cylinder lock 156 to project therein and engage a lock cam which is operable to retract the floating retracting block. The cylinder lock 156 is secured in this position by a lock washer or the like (not shown). An elongated slot 161 and a guide screw 162 for engagement therewith, are provided in the door knob 157 and the cylinder lock 156, respectively, for allowing the door knob to assume projected and retracted positions along its rotational axis with relation to the locking cylinder.

The door knob 157 is biased to its projected position away from the door by the operation of the compression spring 164 housed in the grooves 165 and 166 provided in the cylinder lock 156 and the door knob 157, respectively. When in this projected position, the door knob 157 is free to rotate the cylinder lock 156, and thus in turn retract the locking bolt 130.

When it is desired to lock the door and, thus prevent retraction of the locking bolt 130, the door knob 157 is urged inwardly toward the door against the bias of the spring 164 to its retracted position. As shown in FIGS. 21 and 22, the door knob 157 is automatically held in this position by the engagement of the locking latch 167 of the cylinder lock with the recess 169 provided in the door knob 157. When the door knob 157 is in this retracted position, the boss 170 of the cover 159 engages the recess 171 of the door knob 157, and prevents relative rotational movement between the cover and the door knob, thereby locking the door knob 157 and preventing retraction of the locking bolt.

It will be appreciated from the above, that this embodiment has special application to glass paneled doors and the like since when such a cylinder lock arrangement is provided in the inside part of the door and locked in the manner described above, the locking bolt can not be retracted from the inside without a special key and thus, any attempt by a potential thief to break the glass and reach in to unlatch the door is rendered ineffective.

What is claimed as new and desired to be secured by Letters Patent is:

1. An apparatus of the class described having a housing, a locking bolt mounted in said housing for reciprocal movement between projected and retracted positions relative to said housing, a locking bolt trigger mounted in said housing for reciprocating movement between projected and retracted positions relative to said housing and along a path parallel to that defined by said locking bolt, said locking bolt trigger including latch means to grasp the face of said housing to prevent inadvertent tripping of said locking bolt trigger when in its projected position, first means for biasing said locking bolt and locking bolt trigger to their projected positions and second means for holding said locking bolt in its retracted position when said locking bolt trigger is in its projected position and for releasing said locking bolt to its projected position when said locking bolt trigger is being moved to its retracted position.

2. The apparatus as in claim 1 wherein said second means includes a bolt stop which engages both said locking bolt and said locking bolt trigger.

3. The apparatus of claim 1 wherein said locking bolt and said locking bolt trigger both have a cam notch in their mutually facing surfaces and said second means includes a bolt stop cam which engages said notches.

4. An apparatus for automatically securing closure members with a locking bolt comprising a housing having two parallel guide channels therein which extend through one side thereof, a locking bolt mounted in one of said guide channels for reciprocating movement between projected and retracted positions relative to said side, a locking bolt trigger member mounted in the other of said guide channels for reciprocating movement parallel to said locking bolt and also between projected and retracted positions relative to said one side, said locking bolt trigger member including latch means to grasp the face of said housing to prevent inadvertent tripping of said locking bolt trigger means when in its projected position, said locking bolt and said locking bolt trigger member having cam notches in their interfacing surfaces, means for urging said locking bolt and said locking bolt trigger members to their projected positions, and a floating bolt stop cam interposed between the said two channels and engaging the cam notches of said locking bolt and locking bolt trigger member whereby said bolt stop cam holds said locking bolt in its retracted position when said locking bolt trigger member is in its projected position and releases said locking bolt to its projected position when said locking bolt trigger member is moved to its retracted position.

5. The apparatus of claim 4 wherein the cam notches of said locking bolt and said locking bolt trigger slope away from their interfacing surfaces and in the direction of their projected positions.

6. The apparatus of claim 4 wherein said latch means is spring biased to grasp the face of said housing when said locking bolt trigger member is in its projected position so that a complex force is necessary to move said locking trigger member to its retracted position whereby said apparatus is secured from inadvertent actuation of said locking bolt trigger member.

7. The lock mechanism of claim 4 including means for manually retracting said locking bolt from its projected position to its retracted position.

8. The lock mechanism of claim 4 including means for deadlocking said locking bolt when said locking bolt is in its projected position.

9. An apparatus of the class described for automatically securing two closure members with a locking bolt when said two closure members are in a predetermined relative position and for automatically deadlocking said locking bolt, said apparatus comprising a housing, a locking bolt mounted in said housing for movement between projected and retracted positions, means biasing said locking bolt toward said projected position, releasable bolt stop means within said housing for maintaining said locking bolt in its retracted position and trigger means being arranged to engage one of said closure members when said closure members are substantially in said predetermined position and for effecting release of said bolt stop means whereby said locking bolt is automatically projected to secure said two closure members, said trigger means including latch means to grasp the face of said housing to prevent inadvertent tripping of said trigger means when in its projected position, a deadlocking element mounted within said housing for movement between first and second position, said deadlocking element arranged to unlatch said locking bolt when in said first position and arranged to latch said locking bolt when in a second position, first means for urging said deadlocking element to said first position, and locking bolt retraction means for moving said deadlocking element to said second position when said locking bolt is in the projected position and for returning said deadlocking element to said first position as it retracts the locking bolt to the retracted position.

10. An apparatus of the class described for automatically securing two closure members with a locking bolt when said two closure members are in a predetermined relative position and for automatically deadlocking said locking bolt, said apparatus comprising a housing having first, second and third consecutively arranged guide channels, each arranged parallel to the other, a locking bolt mounted in said second guide channel for reciprocating movement between projected and retracted positions relative to said housing, a locking bolt trigger member mounted in said first guide channel for reciprocating movement between projected and retracted positions relative to said housing, said locking bolt and said locking bolt trigger member having cam notches in their interfacing surfaces, means for urging said locking bolt and said locking bolt trigger member to their projected positions, a floating bolt stop cam interposed between said first and second guide channels and for engaging the cam notches of said locking bolt and said locking bolt trigger member whereby said bolt stop cam holds said locking bolt in the retracted position when said locking bolt trigger member is in the projected position and releases said locking bolt to the projected position when said locking bolt trigger member is moved to the retracted position, a deadlocking element mounted in said third guide channel for movement between first and second positions, means defining a cam slot joining said second and third guide channels and having a cam roller therein, said locking bolt having a cam notch therein at the point where it communicates with said cam slot when in the projected position, means biasing said deadlocking element to a first position, said deadlocking element having a cam notch therein at the point where it communicates with said cam slot when in said first position, and a locking bolt retraction element engaging said deadlocking element to a second position when said locking bolt is in the projected position so that said cam roller is urged through said cam slot and engages the cam notch of said locking bolt thereby locking same and for releasing said deadlocking element to said first position as the locking bolt is moved to the retracted position whereby said cam roller is urged through said slot and engages the notch in said deadlocking element thereby unlocking said locking bolt.

11. A bolt position retaining mechanism comprising a housing, a bolt mounted in said housing for reciprocal movement between projected and retracted positions relative to said housing, a bolt position retaining element also mounted within said housing for limited reciprocal movement in a path parallel to the path of movement of said bolt, a floating cam element held in the casing between said bolt and said retaining element in a fixed location along said paths but movable in the casing in directions transverse to said paths, the mutually facing surfaces of the bolt and retaining element have cam receiving notches which come into and out of alignment with said cam element during reciprocal movement of said bolt and said retaining element respectively said cam being of sufficient size to be forced part way into the notch on said bolt by the non-notched portion of said retaining element for providing retention of said bolt and the notch on the retaining element being of sufficient size to accommodate said cam for allowing release of said bolt.

12. The apparatus of claim 6 wherein said latch means and said trigger member are beveled with the inclination of their surfaces being in a direction away from a latch engaging position whereby said beveled edge converts a lateral force applied to said trigger member and said latch means to a complex force, one component of which disengages said latch means and another component of which retracts said trigger member and latch means.

13. The bolt position retaining mechanism of claim 11 wherein said cam receiving notch on said bolt is positioned in alignment with said cam when said bolt is in a retracted position whereby said bolt is retained in said retracted position, until said cam notch on said bolt retaining element is brought into alignment with said cam.

14. The bolt position retaining mechanism of claim 11 wherein said cam receiving retaining mechanism is positioned in alignment with said cam when said bolt is in a projected position whereby said bolt is retained in said projected position until said cam receiving notch on said bolt retaining element is brought into alignment with said cam.

References Cited
UNITED STATES PATENTS

| | | | |
|---|---|---|---|
| 623,831 | 4/1899 | Romeo | 292—335X |
| 833,267 | 10/1906 | Voight | 292—335 |
| 1,035,617 | 8/1912 | Malone | 292—335 |
| 1,209,383 | 12/1916 | Belley | 292—335 |
| 1,918,563 | 7/1933 | Roedding | 292—335 |

MARVIN A. CHAMPION, Primary Examiner

E. J. McCARTHY, Assistant Examiner

U.S. Cl. X.R.

70—148